United States Patent [19]
Freeman

[11] Patent Number: 5,971,374
[45] Date of Patent: Oct. 26, 1999

[54] SEISMIC DAMPER FOR HIGH VOLTAGE BREAKERS AND DISCONNECT SWITCHES

[75] Inventor: Willie B. Freeman, Irwin, Pa.

[73] Assignee: ABB Power T&D Company Inc., Raleigh, N.C.

[21] Appl. No.: 08/782,664

[22] Filed: Jan. 14, 1997

Related U.S. Application Data

[60] Provisional application No. 60/012,601, Mar. 1, 1996.

[51] Int. Cl.⁶ ........................................................ F16F 1/00
[52] U.S. Cl. .......................... 267/134; 267/162; 267/171; 188/129; 52/167.4
[58] Field of Search ..................................... 188/129, 372; 267/150, 134, 136, 180, 162, 164, 171, 178, 179; 52/167.4, 167.7, 167.8, 167.1; 248/638

[56] References Cited

U.S. PATENT DOCUMENTS

| | | | |
|---|---|---|---|
| 1,826,597 | 10/1931 | Brecht . | |
| 1,860,122 | 5/1932 | Wikander | 267/171 |
| 2,086,321 | 7/1937 | Kudo | 267/180 |
| 2,597,800 | 5/1952 | Hussman | 248/20 |
| 2,732,767 | 1/1956 | Herlach | 188/129 |
| 2,981,511 | 4/1961 | Suozzo | 248/54 |
| 3,010,713 | 11/1961 | Turkovich | 267/1 |
| 3,394,631 | 7/1968 | Thompson | 92/46 |
| 3,794,277 | 2/1974 | Smedley et al. | 248/20 |
| 3,856,242 | 12/1974 | Cook | 248/20 |
| 3,866,724 | 2/1975 | Hollnage | 188/129 |
| 4,010,940 | 3/1977 | Freyler | 188/129 |
| 4,200,256 | 4/1980 | Thiel | 248/548 |
| 4,254,837 | 3/1981 | Jones | 175/67 |
| 4,496,130 | 1/1985 | Toyama | 248/585 |
| 4,540,848 | 9/1985 | Biejar et al. | 174/152 R |
| 4,598,503 | 7/1986 | Berger et al. | 52/27 |
| 4,651,981 | 3/1987 | Passiniemi | 267/162 |
| 4,799,654 | 1/1989 | Eickmann | 267/162 |
| 4,968,010 | 11/1990 | Odobasic | 267/162 |
| 5,054,251 | 10/1991 | Kemeny | 52/167 R |
| 5,056,214 | 10/1991 | Holt | 29/602.1 |
| 5,242,147 | 9/1993 | Kemeny | 248/638 |
| 5,257,680 | 11/1993 | Corcoran et al. | 188/129 |
| 5,456,047 | 10/1995 | Dorka | 52/167.4 |

FOREIGN PATENT DOCUMENTS

3139956 C2 2/1988 Germany .

*Primary Examiner*—Robert J. Oberleitner
*Assistant Examiner*—Mariano Sy
*Attorney, Agent, or Firm*—Woodcock Washburn Kurtz Mackiewicz & Norris LLP

[57] ABSTRACT

Disclosed is a seismic damper for ground equipment such as high voltage breakers and disconnect switches. The disclosed seismic damper is reactive to low frequency seismic disturbances and provides damping in response to both upward and downward vertical forces. The seismic damper is adapted to be connected to such equipment without modifying the equipment. When the seismic dampers are connected to the equipment, the equipment's natural frequency in response to seismic disturbances is reduced. This reduction results from the particular use of a stacked ring compression spring and the particular configuration and assembly of the components of the seismic damper.

13 Claims, 4 Drawing Sheets

SEISMIC DAMPER FOR HIGH VOLTAGE BREAKERS AND DISCONNECT SWITCHES

This application claims §119(e) priority based on provisional application 06/012,601; filed on Mar. 1, 1996.

FIELD OF THE INVENTION

The present invention relates generally to structural supports for large equipment such as high voltage circuit breakers and disconnect switches. More particularly, the present invention relates to a spring loaded seismic damper for damping movement of the equipment in response to seismic disturbances.

BACKGROUND OF THE INVENTION

Large equipment such as high voltage circuit breakers or other switching devices, cannot respond adequately when exposed to a seismic disturbance with a frequency at or above the equipment's natural frequency. As a result of the seismic disturbance, resonant energy builds within the equipment. If the resonant energy becomes too large, deformities can result in the structural materials of the equipment. Ultimately, if a large number of structural deformities occur, the equipment may suffer catastrophic failure.

It is known to utilize spring deflection to absorb the energy of suddenly applied loads and store the energy for subsequent release. The amount of energy stored in a spring is a function of the spring's stiffness K or the spring constant and the distance x the spring is compressed. Some devices attempt to accommodate seismic deflections by either storing the kinetic energy of the seismic force and subsequently releasing the energy back to the earth, or by transferring the energy to the attached equipment, often at a lower frequency than the original seismic force. However, these devices when connected to the equipment have been ineffective in protecting the equipment from sudden seismic events, in part, because such devices do not effectively reduce the equipment's natural frequency.

Often, the spring constants are so large (i.e. the springs are so stiff), that the springs do not reduce the equipment's natural frequency when connected to the equipment in response to low frequency events like earthquakes. Rather, the seismic forces are transferred through the unreactive spring-loaded devices to the equipment. Ultimately, if the forces exerted through the spring are of a large enough magnitude and high enough frequency, the electrical equipment can fail. Therefore, the equipment's natural frequency should be lower with the damping devices than without the damping devices to prevent such failure.

FIG. 1 illustrates a typical arrangement of seismic devices. As shown, damping devices 60, 60' are commonly mounted on each of the support studs 40, 40' of the equipment which is shown generally at 14. A horizontal component 46h of the seismic force 46 that is exerted at the base of the equipment causes a downward vertical force 48 to be exerted on one support stud 40 of the equipment 14. A reactive upward force 50 is exerted on the opposite support stud 40' of the equipment 14. As one support stud 40 of the equipment 14 is forced down, and the opposite support stud 40' of the equipment 14 is forced up, the center of mass 44 of the equipment undergoes a horizontal seismic force 52. In those arrangements when the spring-loaded support device provides little or no damping, the equipment rebounds between the damping devices, imparting a "rocking" motion on the equipment 14. Each cycle of the "rocking," causes horizontal seismic forces 52 to be exerted on the equipment 14. The longer the "rocking" and related horizontal seismic forces 52 are exerted, the more resonant energy builds in the equipment.

By providing a damping capability in a seismic support device, the magnitude of horizontal seismic forces and their duration can be reduced. Several spring loaded seismic devices provide damping in a single direction, but none provide damping in response to both upward and downward forces. For example, some devices provide damping in response to a downward force but not in response to an upward force. Others provide damping only in response to upward forces and not downward forces. Using FIG. 1 as an example, if the pictured seismic devices 60, 60' both provided damping in response to downward forces, only one of the two seismic devices (i.e., the one receiving the downward force, 60) at any one time would provide damping as the equipment 14 rocked from side to side. Similarly, if both devices provide damping only in response to upward force, only one device (i.e., the seismic device receiving the upward force, 60') would actively damp at a given time as the equipment "rocks" from side to side. While such seismic support device may provide some damping in a single direction, such devices do not sufficiently reduce the magnitude and duration of the horizontal seismic forces that are exerted on the equipment. Thus the natural frequency of the equipment in response to a seismic disturbance is not reduced through the use of such devices.

Attempts have been made using single-action dampers to provide double acting damping. Often this has been accomplished through the coupling of two or more single acting dampers. Such arrangements have proven cumbersome because equipment are typically designed to be mounted to a single device. Generally there is no simple method of coupling more than one damper to the equipment at a time. Therefore, these arrangements have proven cumbersome and difficult to implement.

Other prior art seismic devices rely on hydraulic shock absorbers. Unlike the spring loaded devices, the hydraulic devices have been effective at damping the forces that are transferred to an attached equipment. However, these devices sometimes leak hydraulic fluid and have proven by field experience to be maintenance intensive.

Therefore, there is a need to provide an improved seismic damper that is capable of supporting large, heavy equipment, that reduces the natural frequency of equipment in response to seismic events through double acting damping, and can be easily installed without modification to the equipment.

SUMMARY OF THE INVENTION

This object, as well as other objects of the current invention, is fulfilled by a seismic damping system for damping movement in equipment comprising a damping means for dissipating energy in response to both upward and downward forces on the equipment, and a coupling means for attaching the damping means to a base portion of the equipment. The damping means has a stacked ring compression damping spring which compresses in response to both upward and downward forces on the equipment.

The compression damping spring comprises a series of alternating inner rings and larger outer rings. The outer diameters of the inner rings and the inner diameters of the outer rings are beveled such that the beveled outer diameters of the inner rings mate with the beveled inner diameters of the alternating outer rings. Upon compression of the damping spring, the inner rings are elastically displaced to assume a smaller ring diameter and the larger outer rings are elastically displaced to assume a larger diameter, the relative elastic displacements between the inner and outer rings causing frictional forces and resulting in the dissipation of kinetic energy.

A weight bearing means for supporting the weight of the equipment, abuts an end of the damping spring so that the weight bearing means is movable and can compress the damping spring in response to downward forces on said equipment.

The weight bearing means has a crowned top so that said equipment is capable of movement horizontally in response to the horizontal components of forces exerted on the equipment.

The coupling means is adapted to be attached to the equipment without modification to the equipment. The coupling means is disposed between the equipment and a base plate and is attached to the equipment in an area of the equipment used for securing the equipment to a foundation footing.

Other features of the present invention are described below.

BRIEF DESCRIPTION OF THE DRAWINGS

The present invention will be better understood, and its numerous objects and advantages will become apparent by reference to the following detailed description of the invention when taken in conjunction with the following drawings, in which.

DETAILED DESCRIPTION OF THE INVENTION

FIGS. 2 through 8 depict a preferred embodiment of the present invention, distinguish the invention from the prior art, and demonstrate the beneficial characteristics of the invention.

Figure 2:
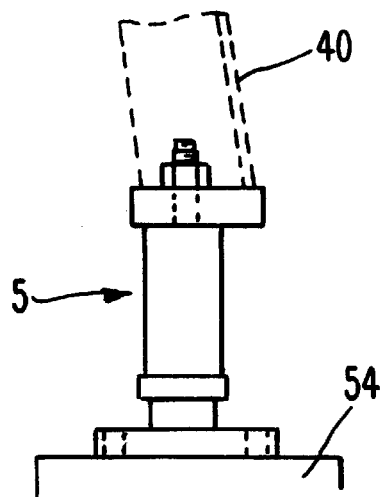
FIG. 2 is a perspective exterior view of a seismic damper in accordance with the present invention.

FIG. 2 is a perspective view of a seismic damper 5 in accordance with the present invention. As shown in FIG. 2, a support stud 40 may be attached to the inventive seismic damper 5 without modification to the support stud 40 by simply bolting the support stud 40 to the seismic damper 5. Typically, if no seismic device were used, the support stud 40 would be bolted directly to the foundation footing 54. It should be noted, that although FIG. 2 depicts a single support stud 40 connected to a single seismic damper 5, it is envisioned that all support studs 40 of the equipment would likewise be connected to a seismic damper 5. A configuration with at least one seismic damper 5 on each support stud 40 isolates the equipment 14 from seismic forces 46.

Figure 3:
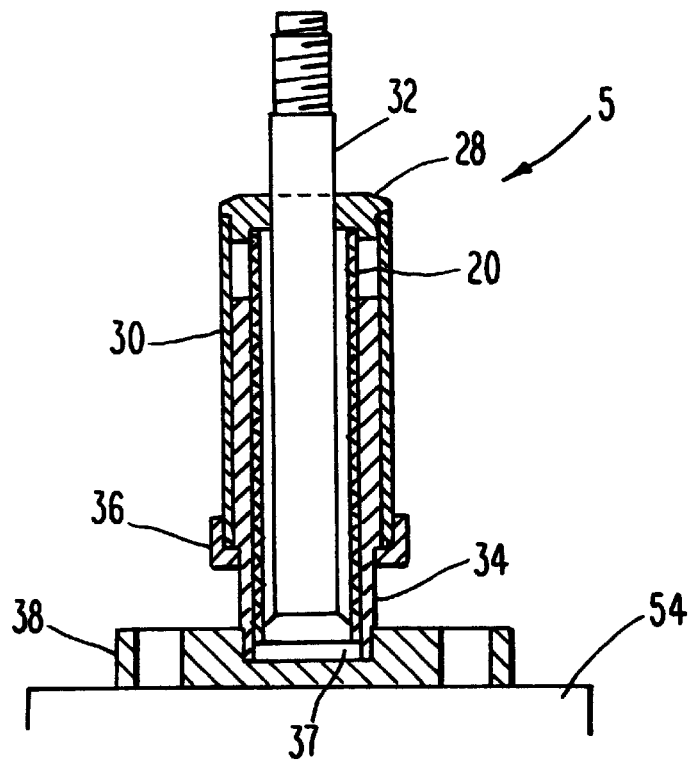
FIG. 3 is a sectional view of the present invention with no exterior forces exerted on the attached equipment.

FIG. 3 provides a sectional view of the inventive seismic damper 5 and illustrates the components in a preferred embodiment. As shown, a damper casing 34 forms the lower exterior portion of the seismic damper 59. In one preferred embodiment, the damper casing 34 is cylindrical in shape but could have other perimetrical forms. The damper casing 34 is firmly attached to a base plate 38, which is firmly connected to a foundation footing 54. The upper exterior portion of the seismic damper 5 comprises a weight bearing means 30, such as an outer housing, which substantially surrounds the upper portion of the damper casing 34. In one preferred embodiment, the outer housing 30 has a crowned top 28 and a cylindrical shape but other shapes may be employed. The outer housing 30 is affixed to the damper casing 34 using a collar 36. The collar 36 has a generally L-shaped cross-section and encircles the damper casing 34 to provide a slotted opening for receiving the lower portion of the outer housing 30. When the collar 36 is assembled over the outer housing 30, the collar 36 holds the outer housing in place over the damper casing 34, thereby limiting the vertical range of motion of the outer housing 30.

As shown, a damping spring 20 is located within the damper casing 34 and outer housing 30. A damping spring compression means 32, or a plunger, extends from near the base plate 38, through the center portion of the spring 20, and continues through a hole in the crowned top 56 of the outer housing 30. A foot pad 37 is firmly attached to the end of plunger 32 closest to the base plate 38. The damping spring 20 rests substantially on top of the foot pad 37. A portion of the plunger 32 extends beyond the crowned top 28 of the outer housing 30 and is meant to be used in connecting the seismic damper 5 to a support stud 40 of the equipment 14. The end of the plunger 32 is threaded so as to easily accept a nut for securing a support stud 40.

Figure 4:
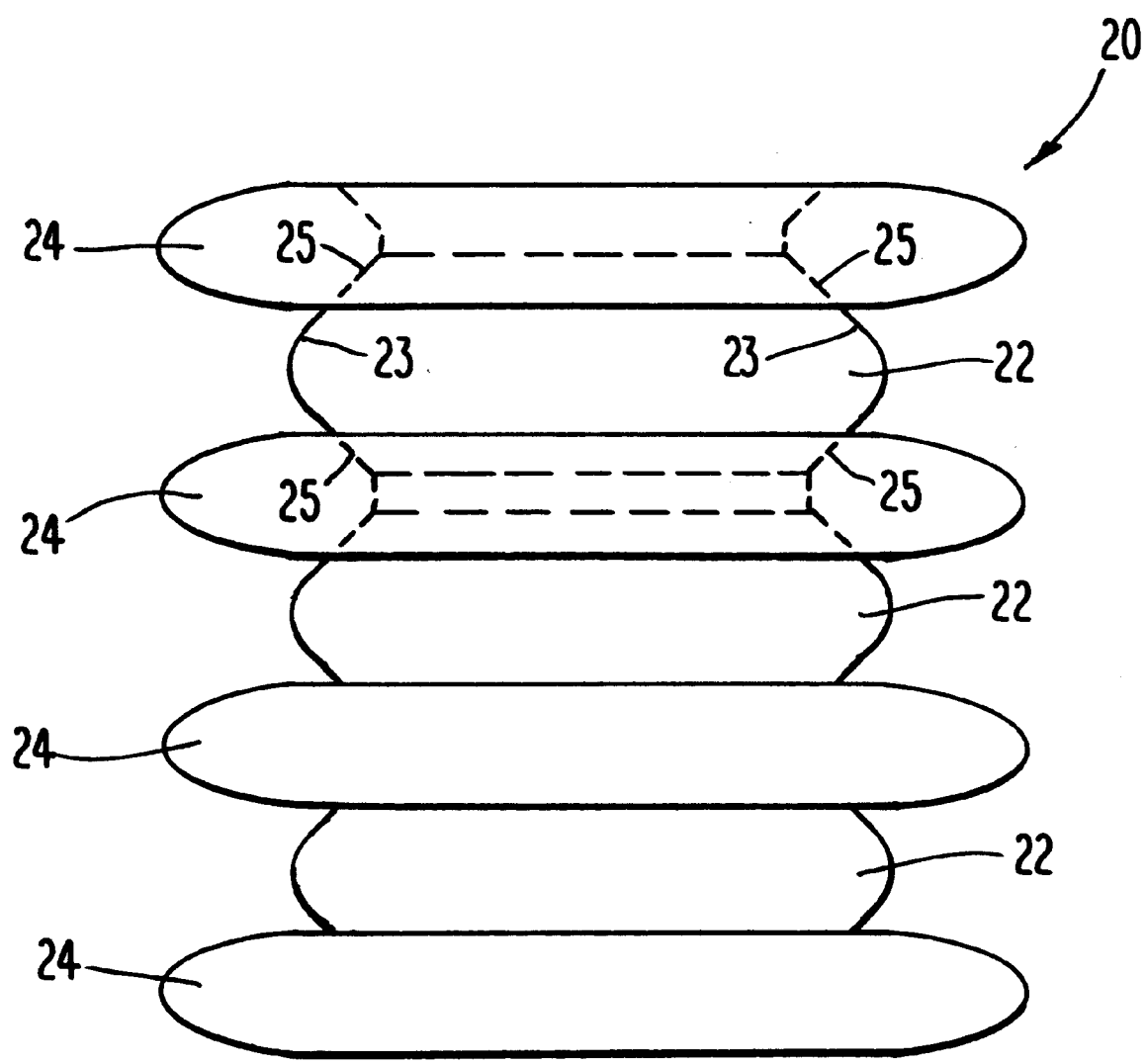
FIG. 4 is an isolated view of the steady state damping spring.
Figure 5:
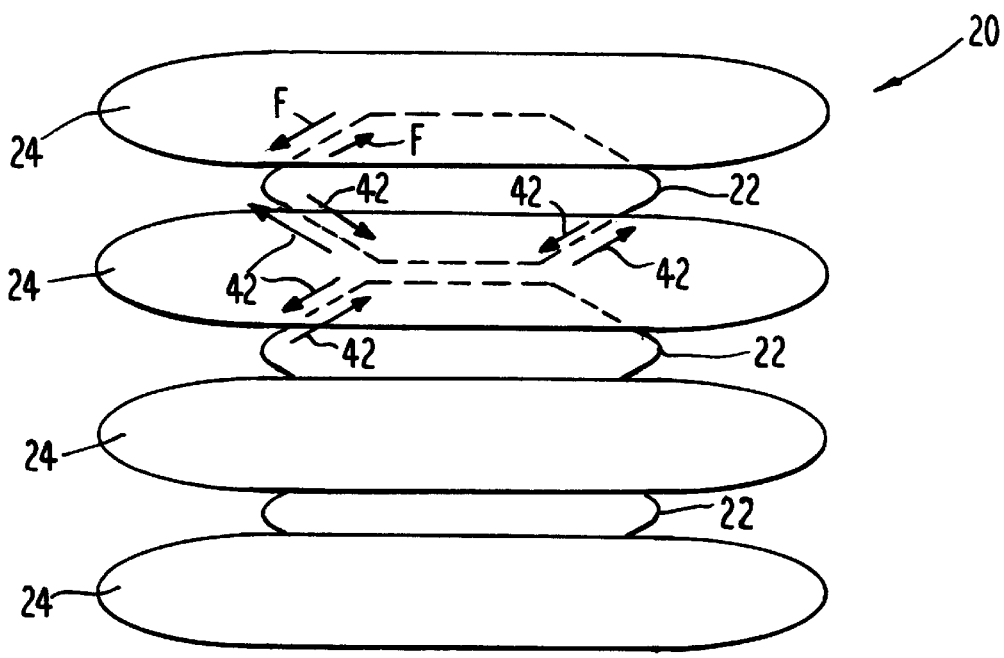
FIG. 5 is an isolated view of the compressed damping spring.

In a preferred embodiment the damping spring 20 is a stacked compression damping spring. FIGS. 4 and 5 illustrate the operation of the stacked ring compression damping spring 20. The damping spring 20 is preferably composed of a series of inner 22 and outer 24 stacked rings. The rings alternate between large outer rings 24 and small inner rings 22. The outer rings 24 have beveled inner diameters 25 which mate with the beveled exterior diameters 23 of the smaller inner rings 22. A damper spring having the structure shown in FIGS. 4 and 5 is manufactured by the Ringfeder Corporation of Westwood, N.J.

As illustrated in FIG. 4, the damping effect of the damping spring 20 results from friction between the spring's inner rings 22 and outer rings 24. When the damping spring 20 is compressed, the inner rings 22 are elastically displaced to assume a smaller diameter. Similarly, the diameters of the outer rings 24 increase when the spring 20 is compressed. As shown in FIG. 4, frictional forces 42 are exerted between the inner rings 22 and outer rings 24 when the elastic displacements take place. The conversion of kinetic energy to heat through frictional forces 42, results in the damping of upward and downward forces. Although the invention's damping characteristics result largely from the stacked ring compression spring 20, the invention is in no way limited to the use of this single type of spring.

Figure 6:
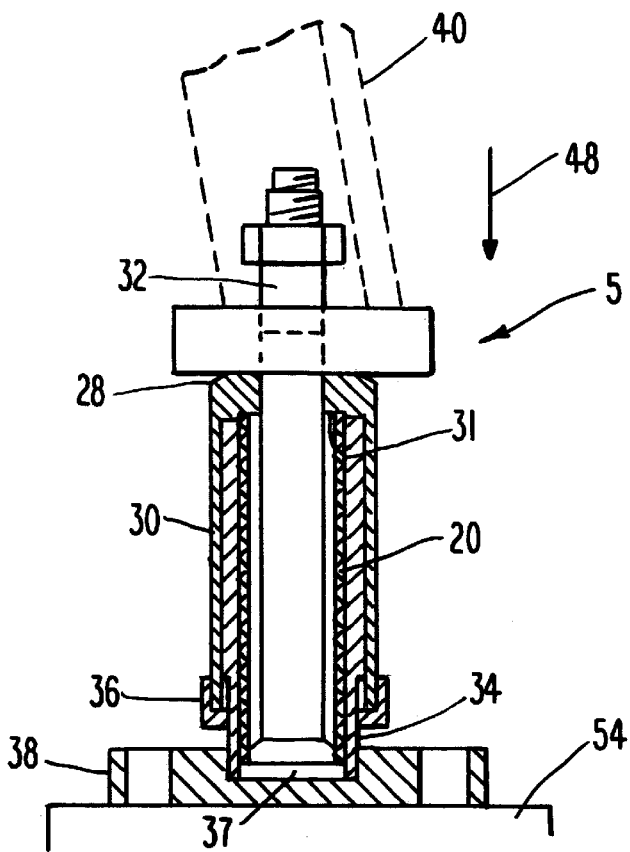
FIG. 6 is a sectional view of the present invention when the damping spring is compressed in response to a downward force on the equipment.

FIG. 6 illustrates the operation of the seismic damper 5 in response to a downward force 48 upon the attached support stud 40. As shown, the support stud 40 rests upon the crowned top 28 of the outer housing 30. The downward force 48 on the support stud 40 is transferred to the outer housing 30. In reaction to the downward force 48, the outer housing 30 moves downward toward the base plate 38, compressing the damping spring 20 between the upper interior wall 31 of the outer housing 30 and the foot pad 37 of the plunger 32. As explained above, the damping spring 20 functions to dissipate energy upon compression. Therefore, a seismic damper 5 in accordance with the present invention functions to dissipate downward forces on a support stud 40.

Figure 7:
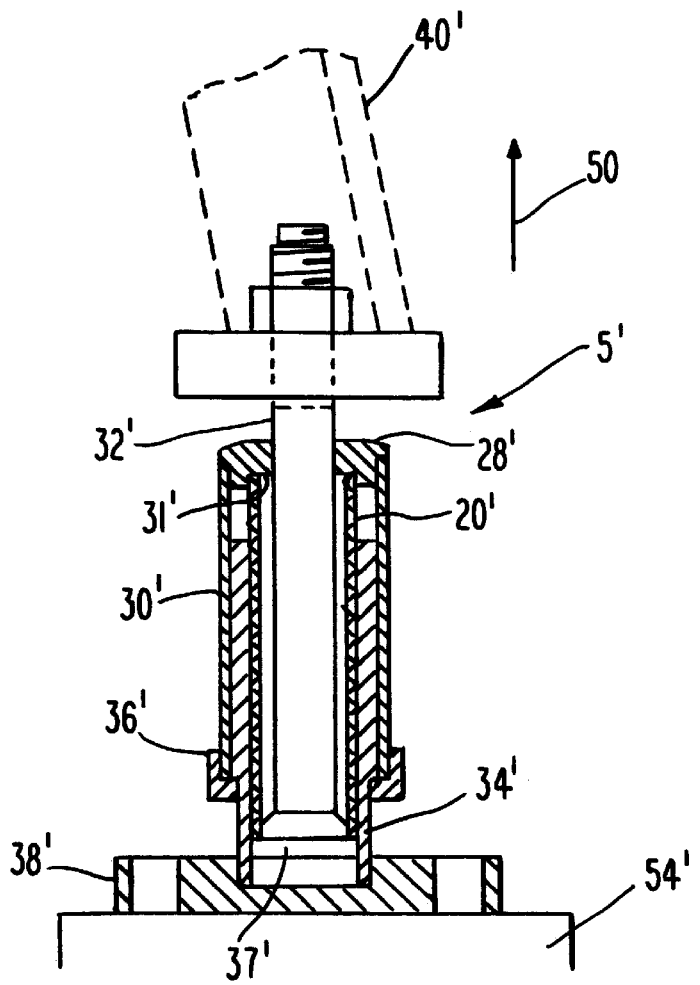
FIG. 7 is a sectional view of the present invention when the damping spring is compressed in response to a upward force on the equipment.

FIG. 7 illustrates the operation of the seismic damper 5' in response to an upward force 50 on an attached support stud 40'. As shown, when the support stud 40' undergoes a vertical upward force 50, the force is transferred to the plunger 32'. When the upward force 50 is exerted on the plunger 32', the foot pad 37' exerts an upward force 50 on the end of the damping spring 20' closest to the base plate 38'. The damping spring 20' is compressed between the foot pad 37' and the upper interior wall 31' of the outer housing 30'. The novel configuration and assembly of each component of the seismic damper 5' effectively compresses the damping spring 20' in response to an upward force. As previously described, the compression of the spring 20' dampens the kinetic energy exerted on the support stud 40'.

The upward force 50 and downward force 48 at opposing ends of the equipment 14 cause the equipment 14 to assume a "rocking" motion. This "rocking" motion requires that the seismic dampers 5, 5' accommodate horizontal motions of the equipment. As shown in FIGS. 3, 6, and 7, the inventive seismic damper's outer housing 30 on which the support stud 40 rests, has a crowned top 28 that allows the support stud 40 to pivot. Therefore, the inventive seismic damper 5 accommodates motions with horizontal components as well as vertical.

The seismic dampers according to the invention reduce the natural frequency of the attached equipment in response to seismic disturbances. In the present invention, the damping spring connected to a side of the equipment moving upward absorbs one-half of the equipment's energy, and the spring connected to the side of the equipment moving downward absorbs one-half the energy. This is compared to the prior art in which a single spring was used to absorb all of the energy. Because two dampers provide damping where the prior art employed a single damper, the double acting damper according to the invention requires a spring constant n that is one-half the effective spring constant K of a single acting damper. Therefore, it is much easier to obtain a damper spring which is stiff enough to support the vertical weight of the equipment and yet still soft enough to react and absorb energy and reduce the response to horizontal seismic forces. The double acting damper has the additional advantage of being able to absorb twice the energy since it works under both the downward compression and upward tension reactions to the horizontal seismic force. The inventive dampers thereby further reduce the natural frequency of equipment subject to seismic events.

Figure 8:
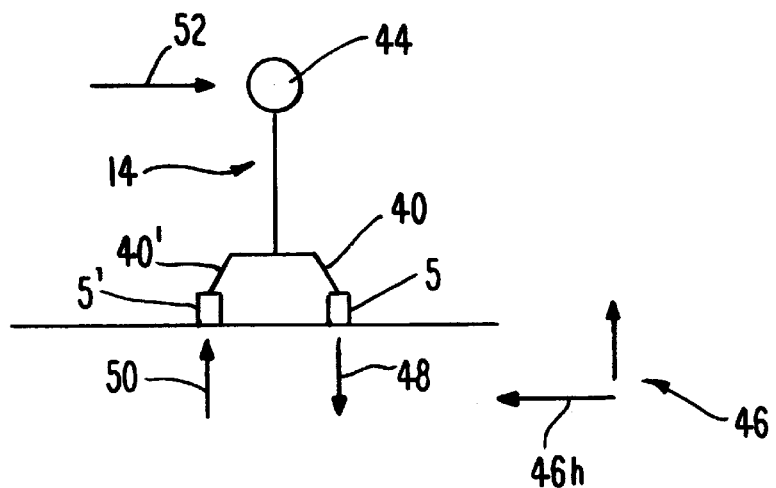
FIG. 8 is a perspective view of a generic item of equipment supported by seismic dampers in accordance with the present invention.

FIG. 8 illustrates several benefits of the double acting seismic damper 5, 5' in more detail. As described previously, the horizontal and vertical components of seismic forces 46 exerted at the base of the equipment 14 result in vertical forces 48, 50 being exerted on the equipment 14 support studs 40, 40'.

Figure 1:
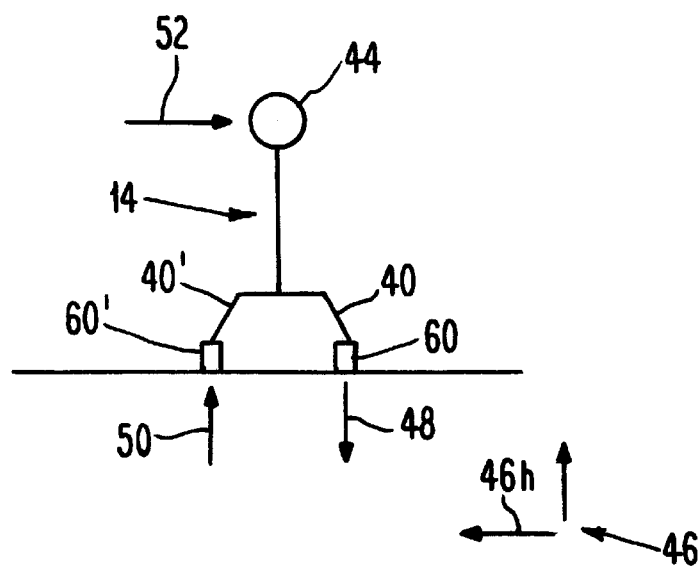
FIG. 1 is a perspective view of a ground mounted equipment supported by prior art seismic devices.

The present invention is particularly designed to deal with these occurrences. While one seismic damper 5 provides damping in reaction to a downward force 48, the opposite seismic damper 5' provides damping in reaction to the reactive upward force 50. As described previously in the discussion of FIG. 6, the damping spring 20 is compressed in response to downward forces 48. Likewise, the spring 20' is compressed in response to upward forces 50 on the equipment 14 as described in connection with FIG. 7. In both situations, the damping springs 20, 20' functions to damp the vertical forces 48, 50 exerted on the body. Furthermore, by damping both upward 50 and downward vertical forces 48, the magnitude and duration of the horizontal seismic force 52 exerted on the equipment 14 is reduced by half from that experienced when, as shown in FIG. 1, prior art single action seismic devices 60, 60' are applied.

The present invention may be employed in other specific forms without departing from the spirit or essential attributes thereof. For example, a device other than a stacked ring compression spring could be utilized to provide damping. Furthermore, a different arrangement could be made for attaching the plunger to particular equipment 14. While the invention has been described and illustrated with reference to specific embodiments, those skilled in the art will recognize that modification and variations may be made without departing from the principles of the invention as described hereinabove and set forth in the following claims.

I claim:

1. A damping system for damping movement in equipment, comprising:

a damping spring having a first end and a second end;

an outer housing operably coupled to said first end of said damping spring, said outer housing having a surface adapted to accept downward force exerted by said equipment, wherein upon a downward force being applied by the equipment to said outer housing, a force is applied to said first end of said damping spring causing said damping spring to compress;

a compression arm having a first end adapted for coupling with the equipment and having a second end operably coupled to said second end of said damping spring, wherein upon an upward force being applied by the equipment to said first end of said compression arm, said second end of said compression arm applies a force on said second end of said damping spring causing said damping spring to compress;

a damper casing adapted to substantially envelop said second end of said damping sprint, wherein said outer housing is adapted to substantially envelop said first end of said damping spring, said outer housing substantially overlapping at least a portion of said damper casing and adapted to be movably telescoping with respect to said damper casing; and a securing means connected to said damper casing and being movable over an external surface of said damper casing and forming an annular opening there between, a bottom portion of said outer housing being received within said annular opening.

2. The seismic damping system as recited in claim 1, further comprising a base plate, wherein said base plate is fixedly connected to said damper casing.

3. The seismic damping system as recited in claim 1, wherein said damping spring comprises a series of alternating inner rings and larger outer rings.

4. The seismic damping system as recited in claim 1, wherein the outer diameters of said inner rings are beveled and the inner diameters of said outer rings are beveled such that the beveled outer diameters of said inner rings mate with the beveled inner diameters of said alternating outer rings.

5. The seismic damping system as recited in claim 1 wherein upon compression of said damping spring, said inner rings are elastically displaced to assume a smaller ring diameter and said larger outer rings are elastically displaced to assume a larger diameter, the relative elastic displacements between said inner and outer rings causing frictional forces and resulting in the dissipation of kinetic energy.

6. The seismic damping system as recited in claim 1, wherein said outer housing has a crowned surface so as to accommodate horizontal movement of said equipment relative to said seismic damping system.

7. The seismic damping system as recited in claim 1, wherein said compression arm is displaced upward relative to said outer housing in response to an upward force exerted on said equipment such that said second end of said compression arm exerts a force on said second end of said damping spring thereby causing said damping spring to compress.

8. The damping system of claim 1, wherein upon a downward force being applied by the equipment to said outer housing, said outer housing moves downward relative to said damper casing.

9. The damping system of claim 1, wherein said first end of said compression arm is threaded.

10. The damping system of claim 1, wherein said second end of said compression arm has an enlarged circumference for interfacing with said damping spring.

11. The damping system of claim 1, wherein said damping spring has a hollowed interior portion, said compression arm extending through said hollow interior portion.

12. A circuit breaker seismic damping system, comprising:

a circuit breaker;

a first foundation footing;

a second foundation footing positioned laterally away from said first foundation footing;

a first dual action damper connected between said first foundation footing and said circuit breaker, said dual action damper comprising the following: a damping spring having a first end and a second end; an outer housing operably coupled to said first end of said damping spring, said outer housing having a surface adapted to accept downward force exerted by said circuit breaker, wherein upon a downward force being applied by the circuit breaker to said outer housing, a force is applied to said first end of said damping spring causing said damping spring to compress; a compression arm having a first end adapted for coupling with the circuit breaker and having a second end operably coupled to said second end of said damping spring, wherein upon an upward force being applied by the circuit breaker to said first end of said compression arm, said second end of said compression arm applies a force on said second end of said damping spring causing said damping spring to compress; a damper casing adapted to substantially envelop said second end of said damping spring, wherein said outer housing is adapted to substantially envelop said first end of said damping spring, said outer housing substantially overlapping at least a portion of said damper casing and adapted to be movably telescoping with respect to said damper casing; and a securing means connected to said damper casing and being movable over an external surface of said damper casing and forming an annular opening there between, a bottom portion of said outer housing being received within said annular opening; and a second dual action damper connected between said second foundation footing and said circuit breaker, said dual action damper comprising the following: a damping spring having a first end and a second end; an outer housing operably coupled to said first end of said damping spring, said outer housing having a surface adapted to accept downward force exerted by said circuit breaker, wherein upon a downward force being applied by the circuit breaker to said outer housing, a force is applied to said first end of said damping spring causing said damping spring to compress; a compression arm having a first end adapted for coupling with the circuit breaker and having a second end operably coupled to said second end of said damping spring, wherein upon an upward force being applied by the circuit breaker to said first end of said compression arm, said second end of said compression arm applies a force on said second end of said damping spring causing said damping sprint to compress; a damper casing adapted to substantially envelop said second end of said damping spring, wherein said outer housing is adapted to substantially envelop said first end of said damping spring, said outer housing substantially overlapping at least a portion of said damper casing and adapted to be movably telescoping with respect to said damper casing; and a securing means connected to said damper casing and being movable over an external surface of said damper casing and forming an annular opening there between, a bottom portion of said outer housing being received within said annular opening.

13. The system of claim 12 further comprising:

at least a third foundation footing positioned laterally away from said first foundation footing and said second foundation footing; and at least a third dual action damper connected between said third foundation footing and said circuit breaker, said dual action damper comprising the following: a damping spring having a first end and a second end; an outer housing operably coupled to said first end of said damping spring, said outer housing having a surface adapted to accept downward force exerted by said circuit breaker, wherein upon a downward force being applied by the circuit breaker to said outer housing, a force is applied to said first end of said damping spring causing said damping spring to compress; a compression arm having a first end adapted for coupling with the circuit breaker and having a second end operably coupled to said second end of said damping spring, wherein upon an upward force being applied by the circuit breaker to said first end of said compression arm, said second end of said compression arm applies a force on said second end of said damping spring causing said damping spring to compress; a damper casing adapted to substantially envelop said second end of said damping spring, wherein said outer housing is adapted to substantially envelop said first end of said damping spring, said outer housing substantially overlapping at least a portion of said damper casing and adapted to be movably telescoping with respect to said damper casing, and a securing means connected to said damper casing and being movable over an external surface of said damper casing and forming an annular opening there between, a bottom portion of said outer housing being received within said annular opening.

* * * * *